US012339666B2

(12) United States Patent
Zhang

(10) Patent No.: US 12,339,666 B2
(45) Date of Patent: Jun. 24, 2025

(54) ELECTRIC MOBILE APPARATUS, CHARGING STATION, AND METHOD FOR CONTROLLING ELECTRIC MOBILE APPARATUS

(71) Applicant: Willand (Beijing) Technology Co., LTD., Beijing (CN)

(72) Inventor: Haifeng Zhang, Beijing (CN)

(73) Assignee: Willand (Beijing) Technology Co., LTD., Beijing (CN)

(*) Notice: Subject to any disclaimer, the term of this patent is extended or adjusted under 35 U.S.C. 154(b) by 284 days.

(21) Appl. No.: 18/074,773

(22) Filed: Dec. 5, 2022

(65) Prior Publication Data

US 2023/0094299 A1  Mar. 30, 2023

Related U.S. Application Data

(63) Continuation of application No. PCT/CN2021/097088, filed on May 31, 2021.

(30) Foreign Application Priority Data

Jun. 10, 2020  (CN) .......................... 202010521970.1

(51) Int. Cl.
*G05D 1/00* (2024.01)
*B60L 53/16* (2019.01)
(Continued)

(52) U.S. Cl.
CPC ............ *G05D 1/0259* (2013.01); *B60L 53/16* (2019.02); *B60L 53/38* (2019.02); *G05D 1/0225* (2013.01);
(Continued)

(58) Field of Classification Search
None
See application file for complete search history.

(56) References Cited

U.S. PATENT DOCUMENTS 11,142,083 B2 * 10/2021 Su ........................... B60L 53/31
2012/0098483 A1 * 4/2012 Patel ....................... G05D 1/028
320/108

(Continued)

FOREIGN PATENT DOCUMENTS

CN   105841691 A   8/2016
CN   107479099 A   12/2017
(Continued)

OTHER PUBLICATIONS

PCT International Search Report of PCT/CN2021/097088 issued on Aug. 26, 2021.

*Primary Examiner* — James J Lee
*Assistant Examiner* — Elizabeth Galyn Martinez
(74) *Attorney, Agent, or Firm* — Emerson, Thomson & Bennett, LLC; Roger D. Emerson; Seth J. Niemi

(57) ABSTRACT

The present disclosure discloses an electric mobile apparatus, a charging station and a method for controlling an electric mobile apparatus. The An electric mobile apparatus includes an apparatus body; a first sensing module arranged on the apparatus body for sensing an electromagnetic signal transmitted from a positioning coil and outputting a first electromagnetic sensing signal; a second sensing module arranged on the apparatus body for sensing the electromagnetic signal transmitted from the positioning coil and outputting a second electromagnetic sensing signal; and a control module connected to the first sensing module and the second sensing module respectively for determining a relative position between the apparatus body and the positioning coil based on the first electromagnetic sensing signal and the second electromagnetic sensing signal, and controlling the apparatus body to move based on the relative position until the apparatus body moves to a target position.

18 Claims, 4 Drawing Sheets

(51) Int. Cl.
  *B60L 53/38* (2019.01)
  *B60W 60/00* (2020.01)
  *H02J 7/00* (2006.01)
(52) U.S. Cl.
  CPC ........ *H02J 7/0042* (2013.01); *B60W 60/0025* (2020.02)

(56) References Cited

U.S. PATENT DOCUMENTS

| | | | |
|---|---|---|---|
| 2016/0347187 A1* | 12/2016 | Wierse | B60L 53/39 |
| 2016/0368387 A1* | 12/2016 | Pavlovsky | B60L 53/126 |
| 2020/0136438 A1 | 4/2020 | Seong | |
| 2022/0029477 A1* | 1/2022 | He | H02J 50/60 |

FOREIGN PATENT DOCUMENTS

| | | |
|---|---|---|
| CN | 109542104 A | 3/2019 |
| CN | 208808382 U | 5/2019 |
| CN | 212989950 U | 4/2021 |
| DE | 102013110280 A1 | 3/2015 |
| JP | 2017221595 A | 12/2017 |

* cited by examiner

ELECTRIC MOBILE APPARATUS, CHARGING STATION, AND METHOD FOR CONTROLLING ELECTRIC MOBILE APPARATUS

CROSS-REFERENCE TO RELATED APPLICATIONS

The present disclosure is a continuation of international application No. PCT/CN2021/097088 filed on May 31, 2021, which claims priority to Chinese Patent Application No. "202010521970.1" filed by Ninebot (Beijing) Technology Co., Ltd., on Jun. 10, 2020, and titled "ELECTRIC MOBILE APPARATUS, CHARGING STATION, AND METHOD FOR CONTROLLING ELECTRIC MOBILE APPARATUS".

TECHNICAL FIELD

The present disclosure relates to the technical field of robots, and specifically relates to an electric mobile apparatus, a charging station, and a method for controlling an electric mobile apparatus.

BACKGROUND

A mobile apparatus, e.g., a mobile robot or an autonomous electric vehicle, needs to know, in a process of automatic charging, about a location of a charging station, and autonomously move to the location of the charging station to complete the charging action. However, it is difficult for a mobile apparatus with low positioning accuracy to automatically complete the charging action.

In related technologies, the positioning of a charging station by a mobile apparatus is implemented by laser, infrared, or magnetic stripe in some solutions. However, it is expensive to provide a laser apparatus, which is unsuitable for a low-cost mobile apparatus; for a mobile apparatus provided with infrared sensing, the infrared sensing performance is less outstanding in an outdoor environment, and there will be a risk of failure in the event of being contaminated by soil; and for a mobile apparatus using a magnetic stripe, a sensor is required to approach the magnetic strip due to structural limitations, and the magnetic stripe will adsorb scrap irons and other substances in air after prolonged time, thereby affecting the precise positioning of the mobile apparatus.

SUMMARY

The present disclosure is intended to solve at least one of the technical problems existing in the prior art.

Therefore, a first object of the present disclosure is to present an electric mobile apparatus which can solve the problem that normal charging cannot be performed due to inaccurate positioning of a charging station.

A second object of the present disclosure is to present a charging station.

A third object of the present disclosure is to present a method for controlling recharging positioning of an electric mobile apparatus.

In order to solve the above problems, an electric mobile apparatus according to embodiments in a first aspect of the present disclosure includes an apparatus body; a first sensing module arranged on the apparatus body for sensing an electromagnetic signal transmitted from a positioning coil and outputting a first electromagnetic sensing signal; a second sensing module arranged on the apparatus body for sensing the electromagnetic signal transmitted from the positioning coil and outputting a second electromagnetic sensing signal; and a control module connected to the first sensing module and the second sensing module respectively for determining a relative position between the apparatus body and the positioning coil based on the first electromagnetic sensing signal and the second electromagnetic sensing signal, and controlling the apparatus body to move based on the relative position until the apparatus body moves to a target position.

The electric mobile apparatus according to embodiments of the present disclosure is provided with the first sensing module and the second sensing module on the apparatus body, for sensing the electromagnetic sensing signals transmitted from the positioning coil respectively, and outputting the electromagnetic sensing signals; and the control module determines the relative position between the apparatus body and the positioning coil based on the electromagnetic sensing signals, and adjusts the position of the apparatus body based on the relative position until the apparatus body moves to the target position. That is, the positioning of the charging station is implemented by magnetic sensing positioning with less interference from the environment, thereby improving positioning accuracy of the charging station, and improving the automatic recharging stability of the electric mobile apparatus. Moreover, the arrangement for sensing the electromagnetic signals based on the first sensing module and the second sensing module has a low cost and therefore satisfies the low-cost demand.

In some embodiments, the control module includes: a first signal converting unit connected to the first sensing module for converting the first electromagnetic sensing signal into a first level signal and a first voltage signal; a second signal converting unit connected to the second sensing module for converting the second electromagnetic sensing signal into a second level signal and a second voltage signal; and a control unit connected to the first signal converting unit and the second signal converting unit respectively for determining the relative position between the apparatus body and the positioning coil based on the first level signal, the second level signal, the first voltage signal, and the second voltage signal.

In some embodiments, the control unit, when determining the relative position between the apparatus body and the positioning coil, is configured to determine that the apparatus body deviates from the positioning coil when a time difference between a moment at which a rising edge of the first level signal is detected and a moment at which a rising edge of the second level signal is detected is greater than or equal to a preset threshold; and is further configured to determine that the apparatus body is located on a coil of the positioning coil when the time difference between the moment at which the rising edge of the first level signal is detected and the moment at which the rising edge of the second level signal detected is less than the preset threshold.

In some embodiments, the control unit, when controlling the apparatus body to move based on the relative position, is configured to control the apparatus body to turn and move when determining that the apparatus body deviates from the positioning coil, until the time difference between the moment at which the rising edge of the first level signal is detected and the moment at which the rising edge of the second level signal is detected is less than the preset threshold; or control the apparatus body to move to the target position along a current direction when determining that the apparatus body is located on the coil of the positioning coil.

In some embodiments, the first sensing module and the second sensing module are disposed at an interval on the apparatus body along a horizontal direction.

In some embodiments, the first signal converting unit includes: a first frequency selecting subunit connected to the first sensing module for performing frequency selection on the first electromagnetic sensing signal to obtain an electromagnetic signal at a target frequency; a first amplifying subunit connected to the first frequency selecting subunit for amplifying the obtained electromagnetic signal at the target frequency; a first wave detection subunit connected to the first amplifying subunit for performing a wave detection process for the amplified electromagnetic signal at the target frequency to obtain the first voltage signal; and a first comparator connected to the first amplifying subunit for comparing the amplified electromagnetic signal at the target frequency with a preset electromagnetic signal to obtain the first level signal. The second signal converting unit includes: a second frequency selecting subunit connected to the second sensing module for performing the frequency selection on the second electromagnetic sensing signal to obtain an electromagnetic signal at the target frequency; a second amplifying subunit connected to the second frequency selecting subunit for amplifying the obtained electromagnetic signal at the target frequency; a second wave detection subunit connected to the second amplifying subunit for performing the wave detection process for the amplified electromagnetic signal at the target frequency to obtain the second voltage signal; and a second comparator connected to the second amplifying subunit for comparing the amplified electromagnetic signal at the target frequency with a preset electromagnetic signal to obtain the second level signal.

In some embodiments, the electric mobile apparatus further includes: a positioning module provided on the apparatus body, and connected to the control module for receiving positioning information; and the control module is further configured to control the apparatus body to move to an electromagnetic sensing region based on the positioning information, prior to controlling the apparatus body to move to a target charging position.

A charging station provided in embodiments in a second aspect of the present disclosure includes: a station body provided with a charging interface; a chassis provided below the station body; and a positioning coil module provided on the chassis, the positioning coil module comprising a positioning coil being configured to transmit an electromagnetic signal at a target frequency to the electric mobile apparatus according to the first aspect of the present disclosure.

The charging station according to the embodiments of the present disclosure is provided with the positioning coil module for transmitting the electromagnetic signal at the target frequency, which can cooperate with the electric mobile apparatus to implement magnetic sensing positioning, thereby reducing the environmental interference on recharging positioning of the mobile apparatus, and improving the positioning accuracy. Moreover, as the magnetic sensing positioning is adopted, the cost is lower.

In some embodiments, the positioning coil module includes: a positioning coil and a power module, where the power module is configured to power the positioning coil, and the positioning coil is configured to transmit the electromagnetic signal at the target frequency.

In some embodiments, a positioning slot is provided on the chassis, and the positioning coil is provided in the positioning slot.

In some embodiments, the positioning slot is rectangular in shape, and is arranged at the bottom of the chassis.

A method for controlling an electric mobile apparatus provided in embodiments in a third aspect of the present disclosure includes: receiving positioning information; controlling the electric mobile apparatus to move to an electromagnetic sensing region of a positioning coil based on the positioning information; acquiring a first electromagnetic sensing signal and a second electromagnetic sensing signal; determining a relative position between the electric mobile apparatus and the positioning coil based on the first electromagnetic sensing signal and the second electromagnetic sensing signal; and controlling the electric mobile apparatus to move based on the relative position until the electric mobile apparatus moves to a target position.

The method for controlling an electric mobile apparatus according to the embodiments of the present disclosure controls an apparatus body of the electric mobile apparatus to move to the target position based on the electromagnetic sensing signals of the first sensing module and the second sensing module provided within the electric mobile apparatus in accordance with change information of the electromagnetic sensing signals, such that the electric mobile apparatus can accurately locate the target position to complete normal charging, and therefore has high positioning accuracy.

In some embodiments, the determining the relative position between the electric mobile apparatus and the positioning coil based on the first electromagnetic sensing signal and the second electromagnetic sensing signal includes: obtaining a first level signal and a first voltage signal based on the first electromagnetic sensing signal, and obtaining a second level signal and a second voltage signal based on the second electromagnetic sensing signal; and determining the relative position between the electric mobile apparatus and the positioning coil based on the first level signal, the second level signal, the first voltage signal, and the second voltage signal.

In some embodiments, the determining the relative position between the electric mobile apparatus and the positioning coil based on the first level signal, the second level signal, the first voltage signal, and the second voltage signal includes: determining that the apparatus body deviates from the positioning coil when a time difference between a moment at which a rising edge of the first level signal is detected and a moment at which a rising edge of the second level signal is detected is greater than or equal to a preset threshold; or determining that the apparatus body is located on a coil of the positioning coil when the time difference between the moment at which the rising edge of the first level signal is detected and the moment at which the rising edge of the second level signal is detected is less than the preset threshold.

In some embodiments, the controlling the electric mobile apparatus to move based on the relative position, until the electric mobile apparatus moves to the target position includes: controlling the apparatus body to turn and move when determining that the apparatus body deviates from the positioning coil, until the time difference between the moment at which the rising edge of the first level signal is detected and the moment at which the rising edge of the second level signal is detected is less than the preset threshold; or controlling the apparatus body to move to the target position along a current direction when determining that the apparatus body is located on the coil of the positioning coil.

A fourth aspect of the present disclosure provides an electric mobile apparatus, being applicable to be charged by a charging station comprising a charging interface and a positioning coil. The electric mobile apparatus comprises: an apparatus body provided with a charging port; a first sensing module arranged on the apparatus body for sensing an electromagnetic signal transmitted from the positioning coil of the charging station and outputting a first electromagnetic sensing signal; a second sensing module arranged on the apparatus body for sensing the electromagnetic signal transmitted from the positioning coil of the charging station and outputting a second electromagnetic sensing signal; and a control module connected to the first sensing module and the second sensing module respectively for determining a relative position between the apparatus body and the positioning coil of the charging station based on the first electromagnetic sensing signal and the second electromagnetic sensing signal, and controlling the apparatus body to move based on the relative position until the apparatus body moves to a target position at which the charging port of the apparatus body is aligned with the charging interface of the charging station.

Additional aspects and advantages of the present disclosure will be partially given in the following description, and will partially become apparent from the following description, or will be understood from the practice of the present disclosure.

BRIEF DESCRIPTION OF THE DRAWINGS

The above and/or additional aspects and advantages of the present disclosure will become apparent and readily understood from the description of embodiments with reference to the accompanying drawings below.

Figure 1:
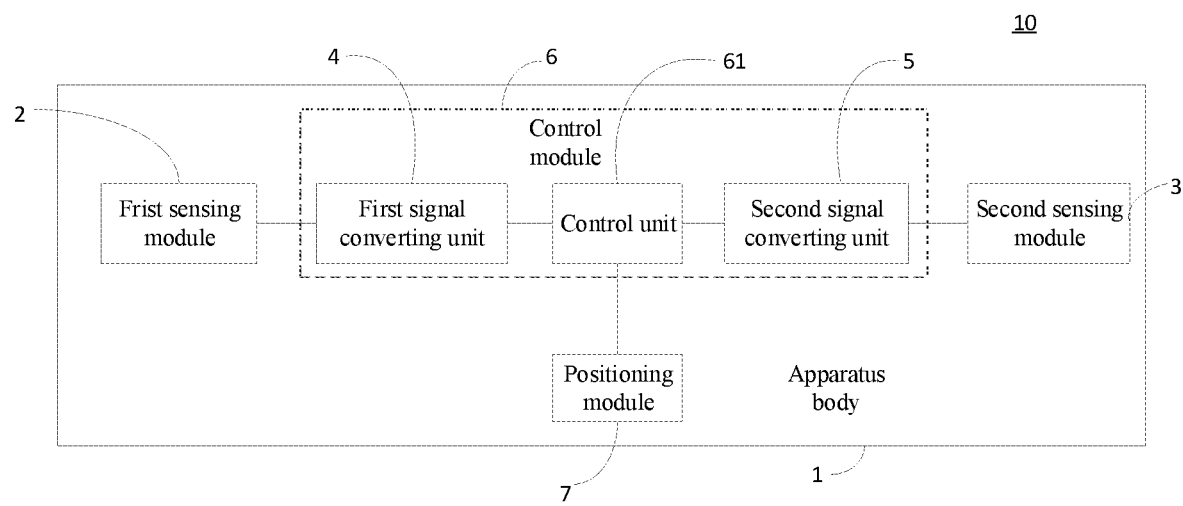
FIG. 1 is a structural block diagram of an electric mobile apparatus according to an embodiment of the present disclosure.

REFERENCE NUMERALS IN THE FIGURES electric mobile apparatus 10; apparatus body 1; first sensing module 2; second sensing module 3; control module 6; first signal converting unit 4; second signal converting unit 5; control unit 61; positioning unit 7;

charging station 20; station body 11; charging interface 12; chassis 13; positioning coil module 14; positioning coil 15;

first frequency selecting subunit 41; first amplifying subunit 42; first wave detection subunit 43; first comparator 44;

second frequency selecting subunit 51; second amplifying subunit 52; second wave detection subunit 53; and second comparator 54.

DETAILED DESCRIPTION OF EMBODIMENTS

Embodiments of the present disclosure will be described in detail below, and examples of the embodiments will be shown in the accompanying drawings, where identical or similar reference numerals represent identical or similar elements or elements having identical or similar functions throughout. The embodiments described below with reference to the drawings are illustrative, are merely used to explain the present disclosure, and should not be construed as limitation on the present disclosure.

The basic concept of controlling the electric mobile apparatus in the embodiments of the present disclosure is that a positioning coil is provided on a side of a charging station, the positioning coil is responsible for transmitting an electromagnetic signal at a target frequency, an electromagnetic sensing module is provided on a side of the electric mobile apparatus, and the electromagnetic sensing module is responsible for receiving the electromagnetic signal at the target frequency transmitted from the positioning coil at a target position, adjusting a position of the electric mobile apparatus by signal processing and logical judgment, and controlling the electric mobile apparatus to move to the target position, e.g., controlling the electric mobile apparatus to move to a charging position of the charging station to complete a charging process. That is, the embodiments of the present disclosure implement recharging positioning of the mobile apparatus based on electromagnetic sensing, thereby solving the problem of failure in normal charging due to inaccurate positioning.

The electric mobile apparatus and the charging station according to the embodiments of the present disclosure are described below with reference to the drawings.

FIG. 1 shows a structural block diagram of an electric mobile apparatus according to embodiments in a first aspect of the present disclosure. As shown in FIG. 1, the electric mobile apparatus 10 according to embodiments of the present disclosure includes an apparatus body 1, a first sensing module 2, a second sensing module 3, and a control module 6.

A first sensing module 2, e.g., an electric sensor, is arranged on the apparatus body 1 for sensing an electromagnetic signal transmitted from a positioning coil at a target position and outputting a first electromagnetic sensing signal; a second sensing module 3, e.g., an electric sensor, is arranged on the apparatus body 1 for sensing the electromagnetic signal transmitted from the positioning coil and outputting a second electromagnetic sensing signal; and a control module 6 is connected to the first sensing module 2 and the second sensing module 3 respectively for determining a relative position between the apparatus body 1 and the positioning coil based on the first electromagnetic sensing signal and the second electromagnetic sensing signal, for example, the apparatus body 1 is inside the coil, or outside the coil, or on the coil, and controlling the apparatus body 1 to move based on the relative position between the apparatus body 1 and the positioning coil until moving to the target position. The target position may be, e.g., a target position for recharging positioning, a management position for managing the electric mobile apparatus, or a maintenance point of the electric mobile apparatus. For example, for recharging positioning, the target position may be understood as such a position where the charging port of the electric mobile apparatus 10 is aligned with the charging interface of the charging station, to facilitate the alignment of the electric mobile apparatus 10 for charging.

The electric mobile apparatus 10 according to the embodiments of the present disclosure is provided with the first sensing module 2 and the second sensing module 3 on the apparatus body 1, for sensing electromagnetic signals at a target frequency respectively, and outputting the electromagnetic sensing signals; and the control module 6 adjusts the relative position between the apparatus body 1 and the positioning coil based on the electromagnetic sensing signals until the apparatus body 1 moves to a target charging position. That is, positioning of the charging station positioning is implemented by magnetic sensing positioning with less interference from the environment, thereby improving the positioning accuracy the charging station, improving the automatic recharging stability of the electric mobile apparatus 10. Moreover, the arrangement for sensing the electromagnetic signals based on the first sensing module 2 and the second sensing module 3 has a low cost and satisfies the low-cost demand.

In some embodiments, the control module 6 includes a first signal converting unit 4, a second signal converting unit 5, and a control unit 61, where the first signal converting unit 4 is connected to the first sensing module 2 for converting the first electromagnetic sensing signal into a first level signal and a first voltage signal; the second signal converting unit 5 is connected to the second sensing module 3 for converting the second electromagnetic sensing signal into a second level signal and a second voltage signal; and the control unit 6 is connected to the first signal converting unit 4 and the second signal converting unit 5 respectively for determining the relative position between the apparatus body 1 and the positioning coil based on the first level signal, the second level signal, the first voltage signal, and the second voltage signal.

Figure 2:
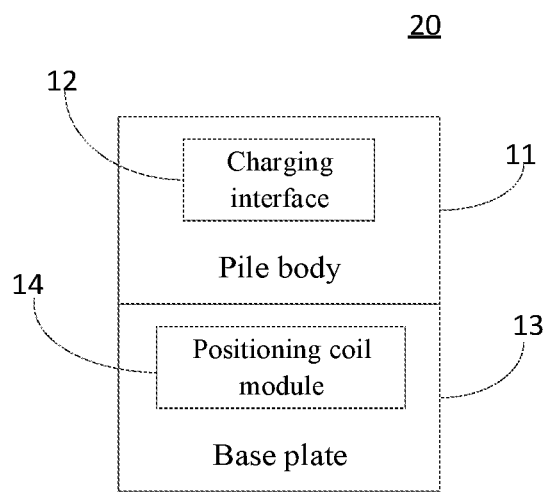
FIG. 2 is a structural block diagram of a charging station according to an embodiment of the present disclosure.

FIG. 2 shows a structural block diagram of a charging station according to embodiments in a second aspect of the present disclosure. As shown in FIG. 2, the charging station 20 of the present disclosure includes a station body 11, a chassis 13, and a positioning coil module 14.

The station body 11 is provided with a charging interface 12; the chassis 13 is provided below the station body 11, and the electric mobile apparatus 10 may, during recharging positioning, first roughly position to this electromagnetic sensing region, i.e., first move onto the chassis 13, and then adjust to a target charging position through a sensing signal of a sensing module; and the positioning coil module 14 is provided on the chassis 13 for transmitting an electromagnetic signal at a target frequency.

It should be noted that the chassis 13 may be arranged right under or laterally under the station body 11, depending on the actual situation. This is not limited.

Figure 3:
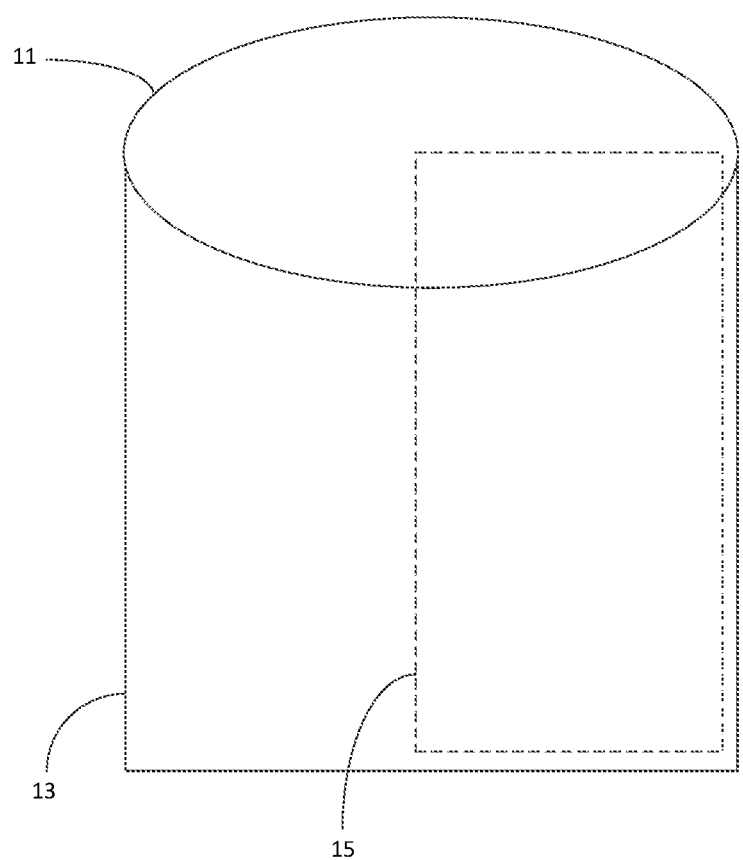
FIG. 3 is a top view of the charging station according to an embodiment of the present disclosure.

FIG. 3 is a top view of the charging station according to an embodiment of the present disclosure. A set position of a positioning coil module 14 may be as shown in FIG. 3. Specifically, the positioning coil module 14 arranged on the charging station 20 transmits an electromagnetic signal at a target frequency, a first sensing module 2 and a second sensing module 3 arranged on the electric mobile apparatus 10 sense the electromagnetic signal at the target frequency, the first sensing module 2 outputs a first electromagnetic sensing signal such as a voltage signal to a first signal converting unit 4, and the second sensing module 3 outputs a second electromagnetic sensing signal such as a voltage signal to a second signal converting unit 5. The signals are converted by signal processing into external interrupt signals, i.e., a level signal and a voltage signal. When the electric mobile apparatus 10 moves to different positions, the electromagnetic signals sensed by the sensing modules are different in sequence. That is, the rising edge signals of the first sensing module 2 and the second sensing module 3 are detected, i.e., the level signals are received, at different moments, and the sensing intensities of with different, so that the converted voltage signals are different. The control unit 61 may determine a current position of the apparatus body 1 by logical judgment and operation based on the acquired level signal and voltage signal, and adjust a position of the apparatus body 1 based on signal changes when moving the apparatus body 1 until the apparatus body 1 moves to a target position, i.e., adjust a position of the electric mobile apparatus 10, for example, moving it to a position aligning with a charging interface 12 of the charging station 20 for normal charging.

Therefore, in the embodiments of the present disclosure, based on magnetic wire positioning, the positioning coil module 14 arranged within the charging station 20 cooperates with the first sensing module 2 and the second sensing module 3 arranged within the electric mobile apparatus 10, and the position of the apparatus body 1 within the electromagnetic sensing region is adjusted based on the electromagnetic sensing signals, such that the apparatus body 1 autonomously moves to the charging interface 12 of the charging station 20 to complete a charging alignment operation and implement the recharging positioning of the electric mobile apparatus 10 at low costs with less interference from the environment, e.g., avoiding the phenomenon of loss of control caused by mud shielding, improving the automatic recharging stability of the electric mobile apparatus 10, and achieving high positioning accuracy.

The electric mobile apparatus 10 according to the embodiments of the present disclosure is provided with the first sensing module 2 and the second sensing module 3 on the apparatus body 1, for sensing the electromagnetic signals at the target frequency and outputting the sensing signals, and converting the sensing signals by the first signal converting unit 4 and the second signal converting unit 5 to acquire a level signal and a digital signal, and the control unit 61 adjusts the position of the apparatus body 1 based on change information of the level signal and the digital signal until the apparatus body 1 moves to a target charging position, thereby accurately locating the target charging position by the electric mobile apparatus 10 for the purpose of completing normal charging. Further, the arrangement of sensing the electromagnetic signals based on the first sensing module 2 and the second sensing module 3, i.e., magnetic wire positioning, in the embodiments of the present disclosure is less costly and less affected by the environment, e.g., avoiding the phenomenon of loss of control caused by mud shielding, and improving the automatic recharging stability of the electric mobile apparatus 10.

In some embodiments, as shown in FIG. 1, the electric mobile apparatus 10 in the embodiments of the present disclosure further includes a positioning module 7 provided on the apparatus body 1, and connected to the control module 6 for receiving positioning information; and the control module 6 is further configured to control the apparatus body 1 to move to an electromagnetic sensing region based on the positioning information, prior to controlling the apparatus body 1 to move to the target position, i.e., first moving to a region where the electromagnetic signal transmitted from the positioning coil is sensible.

For example, during recharging positioning, the electric mobile apparatus 10 may first locate the position of the charging station 20, i.e., the electromagnetic sensing region, by a positioning module such as a BeiDou Navigation Satellite System or a GPS (Global Positioning System).

Because the positioning accuracy of the positioning module 7 is not accurate enough, the mobile apparatus 10 is controlled to move to the target charging position, i.e., a position where the charging port of the mobile apparatus is aligned with the charging interface 12 of the charging station, within the electromagnetic sensing region based on the first sensing module 2 and the second sensing module 3 by magnetic wire positioning, thereby automatically completing charging.

In some embodiments, when the electric mobile apparatus 10 is controlled to move to the target charging position by magnetic wire positioning, the control module 6 performs logical judgment and operation on the acquired level signal and voltage signal, to control the apparatus body 1 to move within the electromagnetic sensing region, until moving to the target position.

Specifically, in the embodiment, the control unit 61, when determining the relative position between the apparatus body 1 and the positioning coil, is configured to determine that the apparatus body 1 deviates from the positioning coil, e.g., is located inside the coil or outside the coil, when a time difference between a moment at which a rising edge of the first level signal is detected and a moment at which a rising edge of the second level signal is detected is greater than or equal to a preset threshold. Further, in some embodiments, the apparatus body 1 is determined to be located outside the coil of the positioning coil when the moment at which the rising edge of the first level signal is detected is later than the moment at which the rising edge of the second level signal is detected, and the first voltage signal is smaller than the second voltage signal, or when the moment at which the rising edge of the first level signal is detected is later than the moment at which the rising edge of the second level signal is detected, and the first voltage signal is larger than the second voltage signal. The control unit is further configured to determine that the apparatus body is located inside the coil of the positioning coil when the moment at which the first level signal is detected is prior to the moment at which the second level signal is detected. The control unit is further configured to determine that the apparatus body 1 is located on the coil of the positioning coil when the time difference between the moment at which the rising edge of the first level signal is detected and the moment at which the rising edge of the second level signal is detected is less than the preset threshold. The time difference being less than the preset threshold means that the moment at which the rising edge of the first level signal is detected is close to the moment at which the rising edge of the second level signal is detected. The preset threshold may be set based on an actual travel error or detection error. For example, the apparatus body is determined to be located on the coil of the positioning coil when the moment at which the first level signal is detected is equal to the moment at which the second level signal is detected.

In the embodiment, for the arrangement of the positioning coil, compared with the apparatus body located inside or outside the coil, it is easier to detect or accurately position the apparatus body 1 located on the coil of the positioning coil. Therefore, in the embodiment, one side of the coil of the positioning coil may be set to correspond to the target position, i.e., the position of the apparatus body 1 located on the coil is found based on the detected level signal and voltage signal. That is, by traveling along one side of the coil of the positioning coil, the apparatus body may accurately reach the target position. When the time difference between the moment of the rising edge of the first level signal and the moment of the rising edge of the second level signal is less than the preset threshold, the apparatus body 1 is determined to be located on the coil of the positioning coil, and may travel to the target position along a current direction, i.e., a direction of the one side of the coil of the positioning coil.

Further, in some embodiments, the control unit 61, when controlling the apparatus body 1 to move based on the relative position, is configured to control the apparatus body 1 to turn and move, e.g., move to a last position, when determining that the apparatus body 1 deviates from the positioning coil 1, until the time difference between the moment at which the rising edge of the first level signal is detected and the moment at which the rising edge of the second level signal is detected is less than the preset threshold; or control the apparatus body 1 to move to the target position along the current direction when determining that the apparatus body 1 is located on the coil of the positioning coil.

For example, when the apparatus body 1 is located outside the coil of the positioning coil 15, the apparatus body 1 is controlled to move towards the inside of the coil; when the apparatus body 1 is located inside the coil of the positioning coil 15, the apparatus body 1 is controlled to move towards the outside of the coil; when the apparatus body 1 is located on the coil of the positioning coil, the apparatus body 1 is controlled to move towards a first direction. When the apparatus body 1 is controlled to move towards the first direction, and when the moment at which the rising edge of the first level signal is detected is later than the moment at which the rising edge of the second level signal is detected, and the first voltage signal is smaller than the second voltage signal, it is determined that the position of the apparatus body 1 on the coil of the positioning coil 15 corresponds to the target position, and the apparatus body 1 is controlled to move along the current direction to the target position, for example, to move to align with the charging interface of the charging station, or, when the apparatus body 1 is located on the coil of the positioning coil 15, the apparatus body 1 is controlled to move towards a second direction opposite to the first direction. When the apparatus body 1 is controlled to move towards the second direction, and when the moment at which the rising edge of the first level signal is detected is prior to the moment at which the rising edge of the second level signal is detected, it is determined that the position of the apparatus body 1 on the coil of the positioning coil 15 corresponds to the target position, and the apparatus body 1 is controlled to return to the last position and move to the target position. That is, when the apparatus body 1 is located on the coil, whether the position corresponds to the target position is further determined based on a signal condition of moving to a next position.

For example, for recharging positioning, a condition that the detection signal of the target charging position is satisfied may be pre-detected and saved based on a set position of the positioning coil 15, and then, during recharging positioning, the control unit 61 may determine whether the acquired level signal and voltage signal of the first sensing module 2 and the second sensing module 3 satisfy the target charging position determining condition, and then determine whether the electric mobile apparatus 10 moves to the target charging position.

Figure 4:
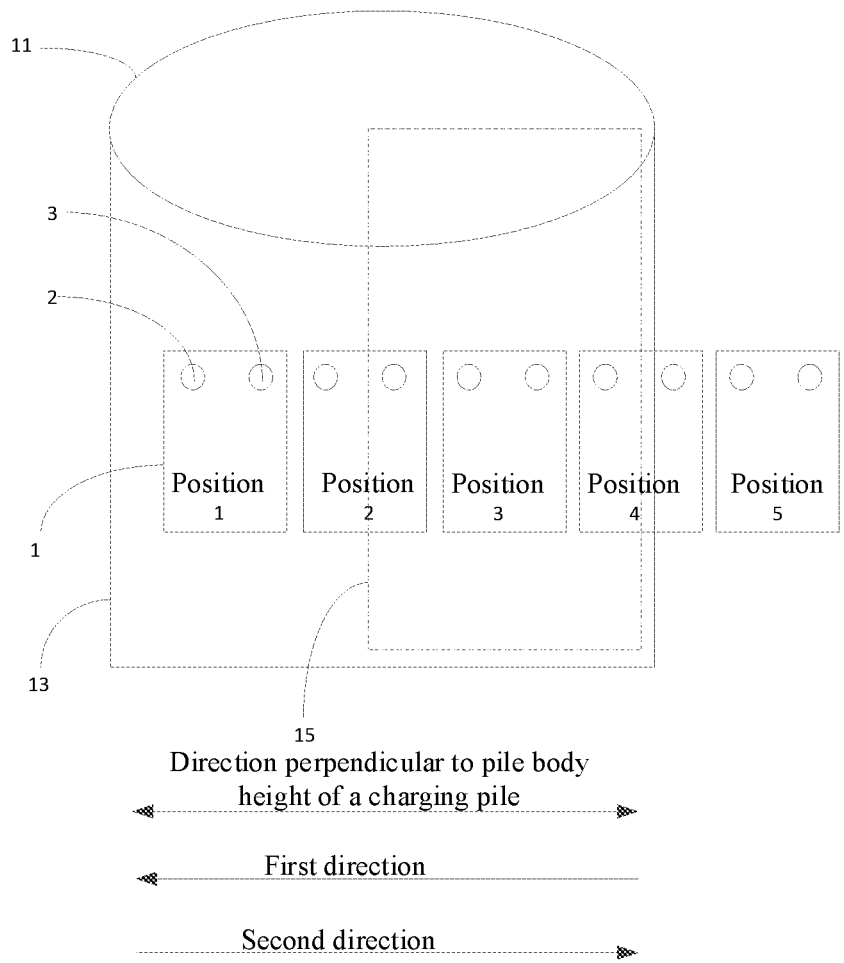
FIG. 4 is a schematic position diagram of the electric mobile apparatus according to an embodiment of the present disclosure.

As shown in FIG. 4, a position 2 in the figure is a position where a charging port of the electric mobile apparatus 10 is aligned with a charging interface of the charging station 20, i.e., the position 2 is a target charging position. When the control unit 61 determines that the acquired level signal and voltage signal of the first sensing module 2 and the second sensing module 3 satisfy the position determining condition, the apparatus body 1 is considered to move to the target charging position, and otherwise, the apparatus body 1 is further controlled to move.

However, as shown in FIG. 4, when the position is set as a symmetrical position of the positioning coil 15, there will be a position where the moments of the rising edge of the level signals are same and voltage signals are equal. To avoid misjudgment, whether the position is the target charging position may be reversely inferred based on a next position to be moved to, or whether the position is the target charging position may be determined by referring to a last position.

For example, assume that the moment at which the rising edge of the first level signal is detected is t1, the first voltage signal is v1, the moment at which the rising edge of the second level signal is detected is t2, and the second voltage signal is v2. As shown in FIG. 4, at the position 2, the moment at which the rising edge of the first level signal is detected is equal to the moment at which the rising edge of the second level signal is detected. When the apparatus body 1 is at the position 2, the control unit 61 will control the apparatus body 1 to move to a second position such as a position 1 along the first direction. At the second position, if the moment at which the rising edge of the first level signal is detected is later than the moment at which the rising edge of the second level signal is detected, and the first voltage signal is smaller than the second voltage signal, i.e., t1>t2, and v1<v2, the first position, i.e., the position 2, is determined as the target charging position, and the apparatus body 1 is controlled to return to the first position, i.e., the apparatus body 1 is controlled to move to the target charging position. Alternatively, the apparatus body 1 is controlled to move from the second position to the first position along the second direction, i.e., the last position where the apparatus body 1 is located is the second position, i.e., the position 1, and then move from the position 1 to the position 2. The apparatus body 1 may be determined to move to the target charging position, where the second direction and the first direction may be a positive direction and a negative direction of a direction perpendicular to the height of the station body of the charging station respectively.

Alternatively, when the apparatus body 1 is at the position 2, the control unit 61 controls the apparatus body 1 to move along the second direction to a third position such as a position 3 in FIG. 4. At the third position, the moment at which the rising edge of the first level signal is detected is prior to the moment at which the rising edge of the second level signal is detected, the first position is determined to be the target charging position, and the apparatus body 1 is controlled to return to the first position, or the apparatus body 1 is controlled to move from the third position to the first position along the first direction, i.e., move from the position 3 (the last position is the position 3) to the position 2 along the first direction, and the apparatus body 1 is determined to move to the target charging position. That is, when the apparatus body 1 deviates from the target charging position, the apparatus body 1 may be controlled to move along a direction, and whether the apparatus body 1 is at the target charging position may be determined based on signal change information of a position to which the apparatus body moves, so as to achieve the purpose of correctly finding the charging station 20 by the electric mobile apparatus 10 with accurate positioning.

However, as shown in FIG. 4, when the apparatus body 1 is at a position 4, due to the factor of structural symmetry of the positioning coil 15, signal information at the position 4 is consistent with that at the position 2, i.e., the moment at which the rising edge of the first level signal is detected and the moment at which the rising edge of the second level signal is detected are same. In this case, the apparatus body 1 is controlled to move along the first direction, i.e., the apparatus body 1 moves to the position 3. In this case, t1<t2, and the position 4 may be determined not to be the target charging position. When the apparatus body 1 is at a position 5, t1>t2, and v1>v2 which fails to satisfy the target charging position condition, i.e., the position 2, the position 5 may be determined to deviate from the positioning coil 15, and then the position of the apparatus body 1 may be further adjusted, until the electric mobile apparatus 10 moves to the target charging position, i.e., a position aligning with the charging interface 12 of the charging station 20.

In the embodiment, a charging port is provided at the back of the apparatus body 1 to cooperate with the charging interface 12 within the charging station 20, and complete normal charging of the electric mobile apparatus 10, and the first sensing module 2 and the second sensing module 3 are arranged at the back of the apparatus body 1, to more accurately locate the charging port to align with the charging interface of the charging station.

In the embodiment, the first sensing module 2 and the second sensing module 3 are disposed at an interval on the apparatus body 1 along a horizontal direction, e.g., horizontally disposed at the interval on the middle part at the back of the apparatus body 1.

Figure 5:
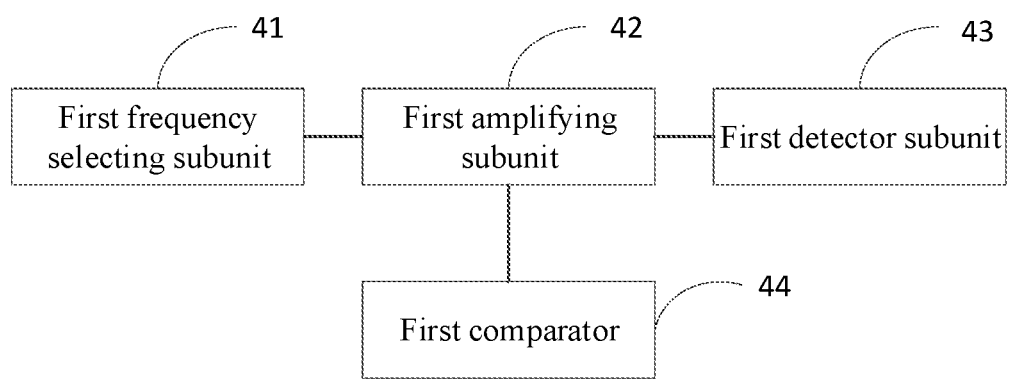
FIG. 5 is a structural block diagram of a first signal converting unit according to an embodiment of the present disclosure.

In the embodiment, as shown in FIG. 5, a first signal converting unit 4 includes a first frequency selecting subunit 41, a first amplifying subunit 42, a first wave detection subunit 43, and a first comparator 44. The first frequency selecting subunit 41 is connected to the first sensing module 2 for performing frequency selection on the first electromagnetic sensing signal of the first sensing module 2 to obtain an electromagnetic signal at a target frequency; the first amplifying subunit 42 is connected to the first frequency selecting subunit 41 for amplifying the obtained electromagnetic signal at the target frequency; the first wave detection subunit 43 is connected to the first amplifying subunit 42 for performing the wave detection process for the amplified electromagnetic signal at the target frequency to obtain a first voltage signal; and the first comparator 44 is connected to the first amplifying subunit 42 for comparing the amplified electromagnetic signal at the target frequency with a preset electromagnetic signal to obtain a first level signal. That is, an analog signal is converted into a level signal and a voltage signal by performing frequency selection, amplification, wave detection process, and other processing steps of the sensed first sensing signal, such that the control unit 61 adjusts the position of the apparatus body 1 based on signal change information.

Figure 6:
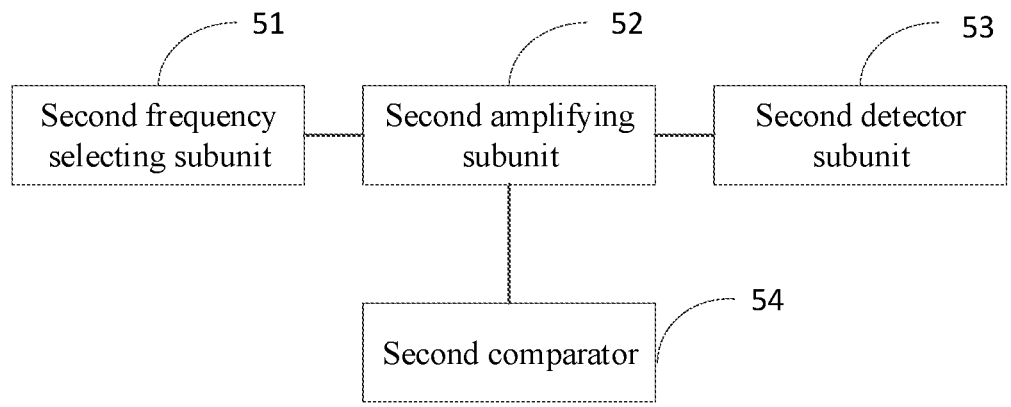
FIG. 6 is a structural block diagram of a second signal converting unit according to an embodiment of the present disclosure.

In the embodiment, as shown in FIG. 6, a second signal converting unit 5 includes a second frequency selecting subunit 51, a second amplifying subunit 52, a second wave detection subunit 53, and a second comparator 54. The second frequency selecting subunit 51 is connected to the second sensing module 3 for performing frequency selection on the second electromagnetic sensing signal of the second sensing module 3 to obtain an electromagnetic signal at a target frequency; the second amplifying subunit 52 is connected to the second frequency selecting subunit 51 for amplifying the obtained electromagnetic signal at the target frequency; the second wave detection subunit 53 is connected to the second amplifying subunit 52 for performing the wave detection process for the amplified electromagnetic signal at the target frequency to obtain a second voltage signal; and the second comparator 54 is connected to the second amplifying subunit 52 for comparing the amplified electromagnetic signal at the target frequency with a preset electromagnetic signal to obtain a second level signal. That is, an analog signal is converted into a digital signal and a level signal by performing frequency selection, amplification, wave detection process, and other processing steps of the sensed second sensing signal, such that the control unit 61 adjusts the position of the apparatus body 1 based on signal change information.

In the embodiment, the electric mobile apparatus 10 may include a mobile robot.

In the charging station 20 according to the embodiments of the present disclosure, a positioning coil module 14 are provided to transmit the electromagnetic signal at the target frequency, and cooperate with the first sensing module 2 and the second sensing module 3 at the electric mobile apparatus 10, to adjust a position of the electric mobile apparatus 10 within a target region, achieve precise alignment between the charging port of the electric mobile apparatus 10 and the charging interface 12 of the charging station, and complete normal charging.

In the embodiment, the positioning coil module 14 includes a positioning coil 15 and a power module. The power module is configured to power the positioning coil 15 to control a discontinuous AC signal at a fixed frequency to flow through the positioning coil 15, and then the positioning coil 15 can transmit the electromagnetic signal at the target frequency. That is, in the embodiments of the present disclosure, the generation of the electromagnetic signal is controlled in an electrical control manner, which neither will adsorb foreign matters, nor needs close contact sensing, and reduces structural limitations, compared with magnetic stripe positioning.

In the embodiment, a positioning slot is provided on the chassis 13, and the positioning coil is provided in the positioning slot, to facilitate the fixing of the positioning coil.

In the embodiment, the positioning slot is rectangular in shape, and is arranged at the bottom of the chassis 13.

Figure 7:
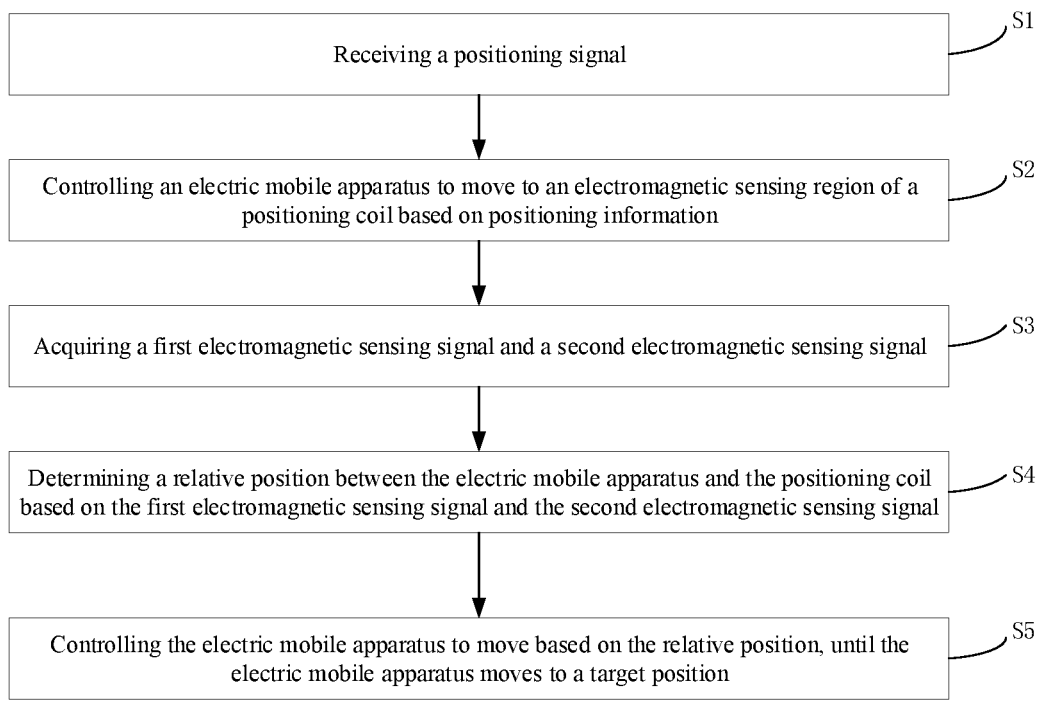
FIG. 7 is a flowchart of a method for controlling an electric mobile apparatus according to an embodiment of the present disclosure.

Embodiments in a third aspect of the present disclosure provide a method for controlling an electric mobile apparatus. As shown in FIG. 7, the method for controlling an electric mobile apparatus according to the embodiments of the present disclosure at least includes a step S1, a step S2, and a step S3.

Step S1: receiving a positioning signal.

Step S2: controlling the electric mobile apparatus to move to an electromagnetic sensing region of a positioning coil based on positioning information.

Step S3: acquiring a first electromagnetic sensing signal and a second electromagnetic sensing signal.

In the embodiment, a first sensing module and a second sensing module are provided within the electric mobile apparatus for sensing an electromagnetic signal at a target frequency. Then, based on the electromagnetic signal, the first sensing module outputs the first electromagnetic sensing signal to a control module, and the second sensing module outputs the second electromagnetic sensing signal to the control module.

Further, a first level signal and a first voltage signal are obtained based on the first electromagnetic sensing signal, and a second level signal and a second voltage signal are obtained based on the second electromagnetic sensing signal. For example, the control module converts an analog signal into digital signals after performing frequency selection, amplification, wave detection process and other processing of the electromagnetic sensing signals. That is, the first level signal, the first voltage signal, the second level signal, and the second voltage signal are acquired.

Step S4: determining a relative position between the electric mobile apparatus and the positioning coil based on the first electromagnetic sensing signal and the second electromagnetic sensing signal.

Step S5: controlling the electric mobile apparatus to move based on the relative position, until the electric mobile apparatus moves to a target position.

In the embodiment, the control unit within the electric mobile apparatus determines the relative position between the electric mobile apparatus and the positioning coil based on the acquired first level signal, second level signal, first voltage signal, and second voltage signal, and adjusts the position of the apparatus body based on signal change information acquired when the apparatus body is moved, until the apparatus body moves to the target position. Therefore, in the present disclosure, the position of the apparatus body is adjusted based on magnetic sensing positioning, such that the apparatus body autonomously moves to a position aligning with the target position, e.g., the charging interface, to complete a charging alignment operation, and implement the positioning of the electric mobile apparatus at low costs with no environmental influence, e.g., avoiding the phenomenon of loss of control caused by mud shielding, and improving the automatic recharging stability of the electric mobile apparatus.

The method for controlling an electric mobile apparatus according to the embodiments of the present disclosure controls an apparatus body of the electric mobile apparatus to move to the target position based on the electromagnetic sensing signals of the first sensing module and the second sensing module provided within the electric mobile apparatus in accordance with change information of the electromagnetic sensing signals, such that the electric mobile apparatus can accurately locate the target position to complete normal charging, and therefore has high positioning accuracy.

In the embodiment, the determining the relative position between the electric mobile apparatus and the positioning coil based on the first level signal, the second level signal, the first voltage signal, and the second voltage signal includes: determining that the apparatus body deviates from the positioning coil when a time difference between a moment at which a rising edge of the first level signal is detected and a moment at which a rising edge of the second level signal is detected is greater than or equal to a preset threshold; or determining that the apparatus body is located on a coil of the positioning coil when the time difference between the moment at which the rising edge of the first level signal is detected and the moment of the rising edge of the second level signal is detected is less than the preset threshold.

For example, the apparatus body is determined to be located outside the coil of the positioning coil when the moment at which the rising edge of the first level signal is detected is later than the moment at which the rising edge of the second level signal is detected, and the first voltage signal is smaller than the second voltage signal, or when the moment at which the rising edge of the first level signal is detected is later than the moment at which the rising edge of the second level signal is detected, and the first voltage signal is larger than the second voltage signal; the apparatus body is determined to be located inside the coil of the positioning coil when the moment of detecting the rising edge of the first level signal is prior to the moment at which the rising edge of the second level signal is detected; and the apparatus body is determined to be located on the coil of the positioning coil when the moment at which the first level signal is detected is equal to the moment at which the rising edge of the second level signal is detected.

In some embodiments, the controlling the electric mobile apparatus to move based on the relative position, until the electric mobile apparatus moves to the target position includes: controlling the apparatus body to turn and move, e.g., move to a last position, when determining that the apparatus body deviates from the positioning coil, until the time difference between the moment at which the rising edge of the first level signal is detected and the moment at which the rising edge of the second level signal is detected is less than the preset threshold; or controlling the apparatus body to move to the target position along a current direction when determining that the apparatus body is located on the coil of the positioning coil.

For example, when the apparatus body is located outside the coil of the positioning coil, the apparatus body is controlled to move towards the inside of the coil; when the apparatus body is located inside the coil of the positioning coil, the apparatus body is controlled to move towards the outside of the coil; when the apparatus body is located on the coil of the positioning coil, the apparatus body is controlled to move towards a first direction. When the apparatus body is controlled to move towards the first direction, and when the moment at which the first level signal is detected is later than the moment at which the second level signal is detected, and the first voltage signal is smaller than the second voltage signal, it is determined that the position of the apparatus body on the coil of the positioning coil is the target position, and the apparatus body is controlled to return to the target position, or, when the apparatus body is located on the coil of the positioning coil, the apparatus body is controlled to move towards a second direction opposite to the first direction. When the apparatus body is controlled to move towards the second direction, and when the moment at which the first level signal is detected is prior to the moment at which the second level signal is detected, it is determined that the position of the apparatus body on the coil of the positioning coil is the target position, and the apparatus body is controlled to return to the target position.

In summary, the electric mobile apparatus and the method for controlling an electric mobile apparatus in the embodiments of the present disclosure determine a relative position between the electric mobile apparatus and a positioning coil based on electromagnetic sensing signal changes, and then adjust a moving position of a moving body of the electric mobile apparatus until moving to a target position, for example, a position where a charging port of the electric mobile apparatus is aligned with a charging interface of a charging station, thereby implementing automatic control of recharging of the electric mobile apparatus, or implementing fixed-point management or maintenance of the electric mobile apparatus, and implementing control based on electromagnetic sensing signals with less interference and high control accuracy at low costs.

In the description of the present specification, descriptions with reference to the terms, such as "one embodiment," "some embodiments," "example embodiment," "example," "specific example," or "some examples," mean that specific features, structures, materials, or characteristics described with reference to the embodiment or example are included in at least one embodiment or example of the present disclosure. In the present specification, schematic expressions of the above terms do not necessarily refer to the same embodiments or examples.

While the embodiments of the present disclosure have been shown and described, those of ordinary skills in the art may understand that: a variety of variations, alterations, replacements, and modifications may be made to these embodiments without departing from the principle and objective of the present disclosure, the scope of which is defined by the appended claims and equivalents thereof

What is claimed is:

1. An electric mobile apparatus, comprising:
an apparatus body;
a first sensing module arranged on the apparatus body for sensing an electromagnetic signal transmitted from a positioning coil and outputting a first electromagnetic sensing signal;
a second sensing module arranged on the apparatus body for sensing the electromagnetic signal transmitted from the positioning coil and outputting a second electromagnetic sensing signal; and
a control module connected to the first sensing module and the second sensing module respectively for determining a relative position between the apparatus body and the positioning coil based on the first electromagnetic sensing signal and the second electromagnetic sensing signal, and controlling the apparatus body to move based on the relative position until the apparatus body moves to a target position;
wherein the control module comprises a first comparator connected to the first amplifying subunit for comparing the amplified electromagnetic signal at the target frequency with a preset electromagnetic signal to obtain the first level signal;
wherein both of the first sensing module and the second sensing module are inductors; and the control module comprises:
 a first comparator, configured to compare the first electromagnetic sensing signal with a preset electromagnetic signal to obtain a first level signal;
 a second comparator, configured to compare the second electromagnetic sensing signal with the preset electromagnetic signal to obtain a second level signal; and
 a control unit, configured to: when determining the relative position between the apparatus body and the positioning coil,
  determine that the apparatus body deviates from the positioning coil when a time difference between a moment at which a rising edge of the first level signal is detected and a moment at which a rising edge of the second level signal is detected is greater than or equal to a preset threshold; or,
  determine that the apparatus body is located on the positioning coil when the time difference between the moment at which the rising edge of the first level signal is detected and the moment at which the rising edge of the second level signal is detected is less than the preset threshold.

2. The electric mobile apparatus according to claim 1, wherein the control module further comprises:
a first signal converting unit connected to the first sensing module, wherein the first signal converting unit comprises a first wave detection subunit for performing a wave detection process for the first electromagnetic sensing signal to obtain a first voltage signal; and
a second signal converting unit connected to the second sensing module, wherein the second signal converting unit comprises a second wave detection subunit for performing a wave detection process for the second electromagnetic sensing signal to obtain a second voltage signal;

wherein the control unit is connected to the first signal converting unit and the second signal converting unit respectively for determining the relative position between the apparatus body and the positioning coil based on the first level signal, the second level signal, the first voltage signal, and the second voltage signal;

wherein the control unit is further configured to: when determining the relative position between the apparatus body and the positioning coil, determine that the apparatus body is located outside the positioning coil when the moment at which a rising edge of the first level signal is detected is later than the moment at which a rising edge of the second level signal is detected, and the first voltage signal is smaller than the second voltage signal, or when the moment at which the rising edge of the first level signal is detected is later than the moment at which the rising edge of the second level signal is detected, and the first voltage signal is larger than the second voltage signal.

3. The electric mobile apparatus according to claim 1, wherein the control unit, when controlling the apparatus body to move based on the relative position, is configured to:

control the apparatus body to turn and move when determining that the apparatus body deviates from the positioning coil, until the time difference between the moment at which the rising edge of the first level signal is detected and the moment at which the rising edge of the second level signal is detected is less than the preset threshold;

or control the apparatus body to move to the target position along a current direction when determining that the apparatus body is located on the positioning coil.

4. The electric mobile apparatus according to claim 1, wherein the first sensing module and the second sensing module are disposed at an interval on the apparatus body along a horizontal direction.

5. The electric mobile apparatus according to claim 2, wherein the first signal converting unit further comprises:

a first frequency selecting subunit connected to the first sensing module for performing frequency selection on the first electromagnetic sensing signal to obtain an electromagnetic signal at a target frequency; and a first amplifying subunit connected to the first frequency selecting subunit for amplifying the obtained electromagnetic signal at the target frequency;

wherein the first wave detection subunit is connected to the first amplifying subunit and further configured to perform a wave detection process for the amplified electromagnetic signal at the target frequency to obtain the first voltage signal; and the first comparator is connected to the first amplifying subunit and further configured to compare the amplified electromagnetic signal at the target frequency with a preset electromagnetic signal to obtain the first level signal; and the second signal converting unit further comprises:

a second frequency selecting subunit connected to the second sensing module for performing the frequency selection on the second electromagnetic sensing signal to obtain an electromagnetic signal at a target frequency; and a second amplifying subunit connected to the second frequency selecting subunit for amplifying the obtained electromagnetic signal at the target frequency;

wherein the second wave detection subunit is connected to the second amplifying subunit and further configured to perform the wave detection process for the amplified electromagnetic signal at the target frequency to obtain the second voltage signal; and the second comparator is connected to the second amplifying subunit and further configured to perform the amplified electromagnetic signal at the target frequency with a preset electromagnetic signal to obtain the second level signal.

6. The electric mobile apparatus according to claim 1, wherein the electric mobile apparatus further comprises:

a positioning module provided on the apparatus body, and connected to the control module for receiving positioning information; and the control module is further configured to control the apparatus body to move to an electromagnetic sensing region of the positioning coil based on the positioning information, prior to controlling the apparatus body to move to the target position.

7. The electric mobile apparatus according to claim 1, wherein the first sensing module and the second sensing module are disposed at an interval on the apparatus body along a horizontal direction such that a distance between the first sensing module and the positioning coil is different from a distance between the second sensing module and the positioning coil when the apparatus body is not located on the positioning coil.

8. The electric mobile apparatus according to claim 1, wherein the relative position between the apparatus body and the positioning coil comprises: the positioning coil being located inside the coil, the positioning coil being located outside the coil, or the positioning coil being located on the coil.

9. The electric mobile apparatus according to claim 2, wherein the control unit, when determining the relative position between the apparatus body and the positioning coil, is further configured to:

determine that the apparatus body is located inside the positioning coil when the moment at which the first level signal is detected is prior to the moment at which the second level signal is detected; and determine that the apparatus body is located on the positioning coil when the time difference between the moment at which the rising edge of the first level signal is detected and the moment at which the rising edge of the second level signal is detected is less than a preset threshold.

10. A charging station, comprising:

a station body provided with a charging interface;

a chassis provided below the station body; and a positioning coil module provided on the chassis, the positioning coil module comprising a positioning coil being configured to transmit an electromagnetic signal at a target frequency to the electric mobile apparatus according to claim 1.

11. The charging station according to claim 10, wherein the positioning coil module further comprises:

a power module, wherein the power module is configured to power the positioning coil.

12. The charging station according to claim 11, wherein a positioning slot is provided on the chassis, and the positioning coil is provided in the positioning slot.

13. The charging station according to claim 12, wherein the positioning slot is rectangular in shape, and is arranged at bottom of the chassis.

14. A method for controlling an electric mobile apparatus, comprising:
receiving positioning information;
controlling the electric mobile apparatus to move to an electromagnetic sensing region of a positioning coil of a charging station based on the positioning information;
acquiring a first electromagnetic sensing signal and a second electromagnetic sensing signal;
determining a relative position between the electric mobile apparatus and the positioning coil based on the first electromagnetic sensing signal and the second electromagnetic sensing signal; and
controlling the electric mobile apparatus to move based on the relative position, until the electric mobile apparatus moves to a target position;
wherein the determining the relative position between the electric mobile apparatus and the positioning coil based on the first level signal, the second level signal, the first voltage signal, and the second voltage signal comprises:
obtaining a first level signal based on the first electromagnetic sensing signal, and obtaining a second level signal based on the second electromagnetic sensing signal; and
determining that an apparatus body deviates from the positioning coil when a time difference between a moment at which a rising edge of the first level signal is detected and a moment at which a rising edge of the second level signal is detected is greater than or equal to a preset threshold; or
determining that the apparatus body is located on the positioning coil when the time difference between the moment at which the rising edge of the first level signal is detected and the moment at which the rising edge of the second level signal is detected is less than the preset threshold.

15. The electric mobile apparatus according to claim 14, wherein the determining the relative position between the electric mobile apparatus and the positioning coil based on the first electromagnetic sensing signal and the second electromagnetic sensing signal further comprises:
obtaining a first voltage signal based on the first electromagnetic sensing signal, and obtaining a second voltage signal based on the second electromagnetic sensing signal; and
determining the relative position between the electric mobile apparatus and the positioning coil based on the first level signal, the second level signal, the first voltage signal, and the second voltage signal.

16. The method for controlling an electric mobile apparatus according to claim 15, wherein the controlling the electric mobile apparatus to move based on the relative position, until the electric mobile apparatus moves to the target position comprises:
controlling the apparatus body to turn and move when determining that the apparatus body deviates from the positioning coil, until the time difference between the moment at which the rising edge of the first level signal is detected and the moment at which the rising edge of the second level signal is detected is less than the preset threshold;
or controlling the apparatus body to move to the target position along a current direction when determining that the apparatus body is located on the positioning coil.

17. The method for controlling an electric mobile apparatus according to claim 14, wherein the target position is a position at which a charging port of the apparatus body is aligned with a charging interface of the charging station.

18. An electric mobile apparatus, being applicable to be charged by a charging station comprising a charging interface and a positioning coil, wherein the electric mobile apparatus comprises:
an apparatus body provided with a charging port;
a first sensing module arranged on the apparatus body for sensing an electromagnetic signal transmitted from the positioning coil of the charging station and outputting a first electromagnetic sensing signal;
a second sensing module arranged on the apparatus body for sensing the electromagnetic signal transmitted from the positioning coil of the charging station and outputting a second electromagnetic sensing signal; and
a control module connected to the first sensing module and the second sensing module respectively for determining a relative position between the apparatus body and the positioning coil of the charging station based on the first electromagnetic sensing signal and the second electromagnetic sensing signal, and controlling the apparatus body to move based on the relative position until the apparatus body moves to a target position at which the charging port of the apparatus body is aligned with the charging interface of the charging station;
wherein both of the first sensing module and the second sensing module are inductors; and the control module comprises:
a first comparator, configured to compare the first electromagnetic sensing signal with a preset electromagnetic signal to obtain a first level signal;
a second comparator, configured to compare the second electromagnetic sensing signal with the preset electromagnetic signal to obtain a second level signal; and
a control unit, configured to: when determining the relative position between the apparatus body and the positioning coil,
determine that the apparatus body deviates from the positioning coil when a time difference between a moment at which a rising edge of the first level signal is detected and a moment at which a rising edge of the second level signal is detected is greater than or equal to a preset threshold; or,
determine that the apparatus body is located on the positioning coil when the time difference between the moment at which the rising edge of the first level signal is detected and the moment at which the rising edge of the second level signal is detected is less than the preset threshold.

* * * * *